United States Patent [19]
Winter et al.

[11] Patent Number: 5,445,767
[45] Date of Patent: Aug. 29, 1995

[54] OPTICAL SWITCHES

[75] Inventors: Christoper S. Winter, Ipswich; Stephen N. Oliver, Felixstowe; James D. Rush, Ipswich, all of England; Allan E. Underhill, Bangor; Callum A. S. Hill, Penisarwaun, both of Wales

[73] Assignee: British Telecommunications Public Limited Company, England

[21] Appl. No.: 273,616

[22] Filed: Jul. 12, 1994

Related U.S. Application Data

[63] Continuation of Ser. No. 930,609, Oct. 1, 1992, abandoned.

[30] Foreign Application Priority Data

Feb. 6, 1990 [GB] United Kingdom ................ 9002626

[51] Int. Cl.⁶ ............................................... F21V 9/04
[52] U.S. Cl. .................................. 252/587; 252/582; 385/141; 385/143
[58] Field of Search ............... 252/582, 587; 359/227, 359/885; 385/141, 143, 142

[56] References Cited

U.S. PATENT DOCUMENTS

| | | | |
|---|---|---|---|
| 3,668,420 | 6/1972 | Vanderslice | 252/582 |
| 3,743,964 | 7/1973 | Drexhage et al. | 252/582 |
| 3,878,478 | 4/1975 | Drexhage | 252/582 |
| 4,992,244 | 2/1991 | Grate | 422/98 |

FOREIGN PATENT DOCUMENTS

| | | |
|---|---|---|
| 1941253 | 2/1970 | Germany . |
| 3800085A1 | 7/1988 | Germany . |

OTHER PUBLICATIONS

IEEE Journal of Quantam Electronics, vol. 18, No. 10, Oct. 1982, IEEE, S. M. Jensen: "The Nonlinear Coherent Coupler", pp. 1580-1583, see the whole document.
Proceedings of the S.P.I.E., vol. 971, Aug. 1988, (San Diego), J. F. Nicoud: "New Materials for Second Harmonic Generation: Tentative Control of Non-Centrosymmetry in Organic Crystals", pp. 2-9, see Chapter 2.3 organometallics.

*Primary Examiner*—Philip Tucker
*Attorney, Agent, or Firm*—Nixon & Vanderhye

[57] ABSTRACT

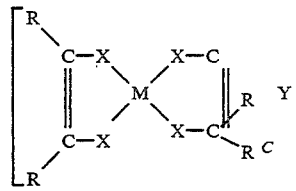

The specification identifies dithiolenes which give good performance as the critical region of an optical switch. The dithiolenes have the formula shown in FIG. 1 wherein: (A) the R groups, any two of which may be the same or different, are selected so as to tune the absorption bands of the molecule for use at the operational wavelength and/or to act as bridges to join molecules together: (B) the X groups, any two of which may be the same or different, are selected from S and Se: (C) M is selected from Ni, Pt, Pd and Cu: (D) C= −1 or 0: and (E) (i) when C=−1, Y is a cation to render the molecule electrically neutral: preferably Y is selected from ammonium, substituted ammonium, Na+, Li+ and K+, (ii) when C=0, Y is absent (since the molecule is neutral there is no change to balance). The dithiolene may be diluted with an organic polymer selected from polyacrylates, polymethacrylates, such as polymethymethacrylate, polycarbonates, polyisobutylene, polyethylene terephthalate, polystyrene and polysiloxane.

14 Claims, 3 Drawing Sheets

DTL1

DTL2

DTL3

DTL4

OPTICAL SWITCHES

This is a continuation of application Ser. No. 07/930,609, filed Oct. 1, 1992, now abandoned.

BACKGROUND

I. Field of the Invention

This invention relates to optical switches and, more specifically, to switches in which an optical signal is switched under the control of actuating radiation at optical wavelengths. For example, a signal having a wavelength in the range 500 nm to 2000 nm is switched by actuating radiation having a wavelength in the range 500 nm to 2000 nm.

II. Related Art and other Considerations

In telecommunications it is usually essential to distinguish between an optical "signal" (ie the telecommunications traffic which is usually at 1.3 μm or 1.5 μm) and control radiation. This requirement can be achieved by using different wavelengths so that the signals can be separated, eg by suitable filters.

In other applications, eg image processing and optical composition, it may not be possible to distinguish two categories of signal and only one wavelength will be used. It is often convenient to regard the switch as a threshold detector and an EXCLUSIVE-OR-gate could be constructed in this way.

The optical switches usually take the form of waveguiding structures having one or more path regions. Integrated devices comprising several switches at close proximity are also possible. Separate path regions may be needed for signals and actuating radiation. The switching is achieved by changing the refractive index of critical regions located in either a path region and/or cladding regions, eg a critical region may be located between two path regions. To effect the switching, each critical region is composed of operative material which is sensitive to the actuating radiation. The architectures of a wide variety of optical switches have already been established but the chemical nature of the active ingredient is clearly important; for example, the active ingredient should display sufficiently large changes of refractive index for practical intensities of actuating radiation and the changes should occur quickly when the actuating radiation is switched on or off. The selection of active ingredient is a problem.

SUMMARY

This invention selects a metal dithiolene as the active ingredient. These dithiolenes are tetravalent groups each having two five-membered rings as shown in FIG. 8 of the drawings.

In FIG. 8, M (which is part of both five-membered rings), is selected from Ni, Pt, Pd and Cu. The X groups, any two of which may be the same or different, are selected from S and Se. There are four unsatisfied bonds in FIG. 8 because the group is tetravalent. The dithiolene grouping may be electrically neutral or it may have a charge of −1 (minus one). This charge is represented by Q in this specification and when Q=−1 a cation is needed to confer electrical neutrality. When all the free valencies of FIG. 8 are satisfied with monovalent groups a molecule with one dithiolene grouping results. Free valencies may also be satisfied with divalent groups to produce molecules with a plurality of dithiolene groups, e.g. polymeric compounds. Where a molecule includes a plurality of dithiolene groups each group has its own Q-value, the Q-value of the complete molecule is the sum of the individual values. Cations are needed to balance the total C-value. If each dithiolene grouping is neutral the complete molecule will be neutral. In a compound with more than one M atom, any two may be the same or different.

It is the grouping illustrated in FIG. 8 which constitutes the functional part of the molecule.

It provides a delocalised electron system which gives rise to the switching properties. The central metal atom, ie Ni, Pt, Pd or Cu, affects the nature of this delocalisation. The groups attached to the free valencies also have a slight effect on the delocalisation but their major effect is on the energy levels and, therefore, on the wavelength of the absorption bands. Thus they are selected so that there is an absorption band close to the operational wavelength. Changing them enables fine tuning to be achieved. The preferred dithiolenes have the general formula 1 (which is shown in FIG. 1 of the drawings) wherein:

(A) the R groups, any two of which may be the same or different, are selected so as to tune the absorption bands of the molecule for use at the operational wavelength, and/or to act as bridges to link molecules together;

(B) the X groups, any two of which may be the same or different, are selected from S and Se, preferably all the X groups are S;

(C) M is selected from Ni, Pt, Pd and Cu;

(D) Q=−1 or 0; and (E)
  (i) when Q=−1, Y is a cation to render the molecule electrically neutral; preferably Y is selected from ammonium, substituted ammonium, $Na^+$, $Li^+$ and $K^+$, or
  (ii) when Q=0, Y is absent (since the molecule is neutral there is no charge to balance).

Particularly suitable R-groups include:
  (i) hydrogen atoms;
  (ii) alkyl groups or halogenated alkyl groups with 1 to 10 carbon atoms, said groups being connected directly to the ring;
  (iii) alkyl groups or halogenated alkyl groups with 1 to 10 carbon atoms connected to the ring via a bridge selected from —O—, —$C_5H_4$— and —NH—;
  (iv) cyanide radicals;
  (v) amine groups, optionally substituted with two alkyl groups having not more than 15 carbon atoms in total;
  (vi) Phenyl groups, optionally substituted with Br, $OCH_3$, $N(CH_2)_2$, $CH_3$, Cl, F;
  (vii) heterocyclic groups;
  (viii) halogen atoms.
  (ix) bridge groups preferably selected from alkylene or halogenated alkylene groups with 1–10 carbon atoms or said groups with one or two terminal groups selected from —O—, —$C_5H_4$—, and —NH—.

Some examples of specific compounds, in which M-Ni, X=S, Q=0 and all four R-groups take the same value, are given below (λ is the wavelength of the absorption band).

| λnm | R-groups |
| --- | --- |
| 720 | hydrogen |
| 774 | methyl |

-continued

| λnm | R-groups |
|---|---|
| 866 | phenyl |
| 982 | 2-thienyl |
| 1120 | 4-(dimethylamino)phenyl |
| 1270 | Juolidene |
| 1370 | 3 -N, N'-diethyletrahydroquinazoyl |

Preferred polymeric dithiolenes are shown in FIG. 9 wherein M, X, and R (any two of which may be the same or different) are as defined above and B is an alkylene or halogenated alkylene groups with 1-10 carbon atoms, A is selected from direct bonds, —O—, —C$_5$H$_4$— and —NH—.

Q is 0 or −1 at each occurence of M and n is 2 to 100.

The number of cations (Y) balances the total charge. When the total is zero Y is absent.

The polymeric dithiolenes are novel compounds.

The critical regions may consist of a pure dithiolene or a mixture of dithiolenes with one another or with a host medium (such as an organic polymer) transparent to both signal and actuating radiation.

The dithiolene/host mixture can be regarded as a solid solution of the dithiolene in the host or as a glass-phase medium having a structure similar to the inorganic, eg silica and halide, glasses. Specific hosts which are particularly suitable include polyacrylates, polymethacrylates such as polymethymethacrylate, polycarbonates, polyisobutylene, polyethylene terephthalate, polystyrene and polysiloxane.

The host material exerts the primary control over transmission properties and especially the host material defines the refractive index of the critical region but the host material is passive so far as the switching operation is concerned.

The dithiolene is affected by the actuating radiation and it changes its refractive index in the presence of the actuating radiation. When the dithiolene changes its refractive index, the index of the total operative composition also changes. The concentration of the dithiolene is selected so as to produce the change or index needed to actuate the switch. In most cases the change of index is within the range $10^{-5}$–$10^{-1}$ and 1°/o to 100°/o of dithiolene usually gives changes of this magnitude.

A critical region may be located either in a path region or a confining region. Thus the dithiolene compositions (used according to the invention) are used in conjunction with other materials which form the rest of the device; these materials are selected to accommodate the wavelength for which the switch device is designed. The dithiolene compositions are compatible with most of the materials used in switching devices, eg inorganic glasses such as silicates, borosilicates, silica and germania glasses as well as halide, especially fluoride, glasses. Plastics, eg the materials used as hosts, may also be used as other materials in the switch. The invention includes not only the optical switches but also the novel dithiolene/host compositions.

BRIEF DESCRIPTION OF THE DRAWINGS

The invention will now be described by way of example with reference to the accompanying drawings in which.

DETAILED DESCRIPTION OF THE DRAWINGS

Figure 2:
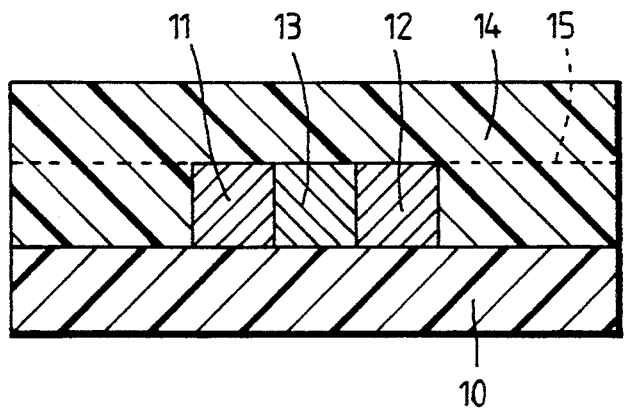
FIG. 2 is a cross section through a conventional switching device showing the layers.
Figure 3:
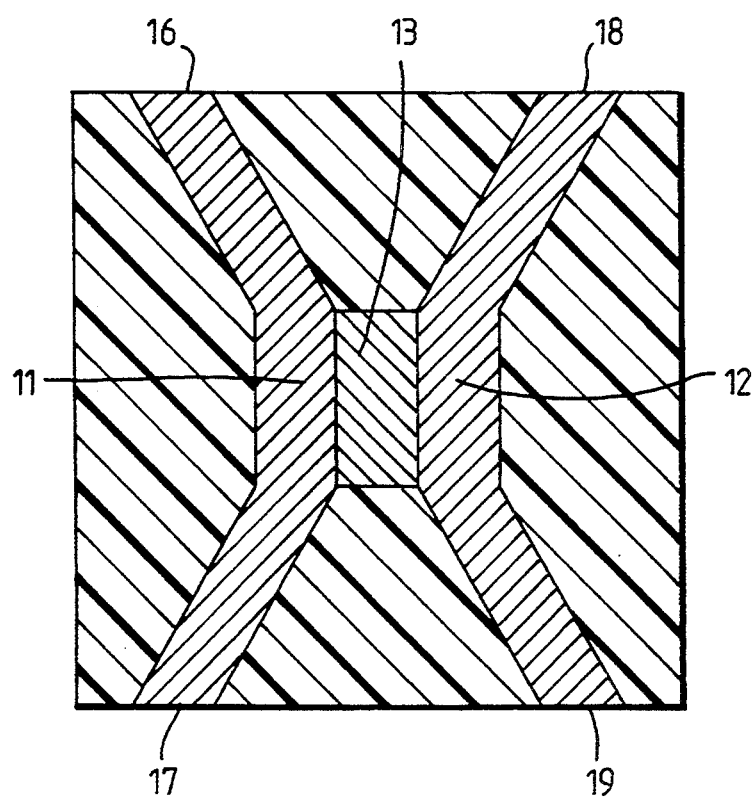
FIG. 3 is a cross section through the device of FIG. 2 showing the arrangement of path regions in the device shown in FIG. 2.
Figure 7:
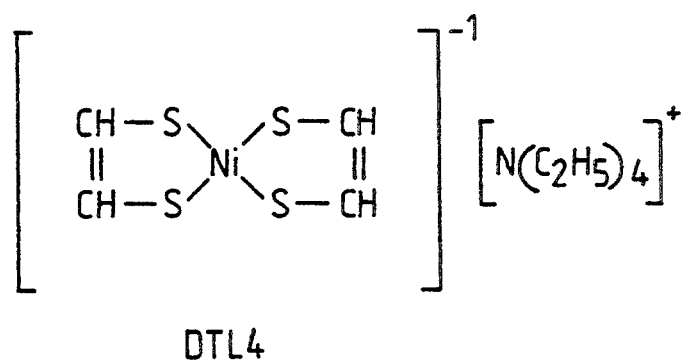
Figure 8:
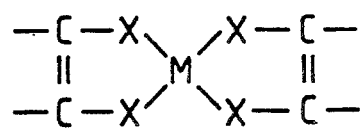
FIG. 8 shows the generic formula of the dithiolene ring system.

FIGS. 2 and 3 illustrate architectures suitable for use in a switch according to the invention. The switch is constructed out of an etched wafer and FIG. 2 is a cross section through the layers of the wafer.

The switch has a silica substrate 10 with ridges 11 and 12 of silica/germania to act as path regions. As is conventional, a critical region 13 is located between the two path regions 11 and 12.

The critical region is operatively linked to both path regions 11 and 12 and, if desired, it could extend further into either or both path regions. In accordance with this invention, the active ingredient in the critical zone is a dithiolene, e.g. one having the generic formula shown in FIG. 1 or FIG. 9. The path regions 11 and 12 and the critical region 13 are covered by a protective layer 14, eg a plastics layer. The protective layer 14 and the substrate 10 co-operate to form a confining region which hinders radiation leakage from the path regions 11 and 12 and the critical region 13.

The device is further illustrated in FIG. 3 which shows that path region 11 has an input port 16 which can be connected to a source of telecommunications traffic (not shown) and an output port 17 to which a first output device (not shown) can be connected. Path 12 has an input port 18 adapted for attachment to a control laser (not shown) for conveying actuating radiation to the critical region 13. Path 12 has an output port 19 which can be connected to a second output device (not shown). Many other architectures and modes of implementation are well known to those skilled in the art.

To prepare a device, a uniform layer of silica/germania, indicated by 15 in FIG. 2, was deposited onto a silica substrate 10. Using well established masking and etching techniques the unwanted parts of the uniform layer 15 were removed to form path regions 11 and 12. After the active composition is introduced into the critical region 13 the protective layer 14 is applied.

In the use of the device for telecommunications, traffic, ie an optical signal, is launched into path 11. Actuating radiation, provided by a switched laser, is launched into path 12.

When radiation is present in both paths 11 and 12, ie when the laser is switched on, their evanescent fields interfere in the critical region 13. As a result of the interference the signal radiation which enters at port 18 can be switched to either output port 17 or output port 19.

It is emphasised that the configurations and architectures are well known to persons skilled in the art. Complex devices involving several switches are also known. This invention resides in the material selected for the critical zone, ie materials which interact favourably with the signal and the actuating radiation.

FIGS. 4, 5, 6 and 7 give the structural formulae of four different dithiolenes, hereinafter identified as DTL1, DTL2, DTL3 and DTL4, particularly suitable for use in compositions according to the invention.

There are certain critical operational requirements for switches and the selection of the material is important to achieve these requirements. The most important requirements are mentioned in Table I.

TABLE I

| Actuating Power | less than 100 mW |
| Switching Time | less than 100 ps |
| Transmission | at least 80°/o |

In Table I the "actuating power" is the optical power which is present in the critical region and necessary to cause switching. In practical applications it can be taken as the power which the actuating laser must supply. The "transmission" is the percentage of the signal power (provided at port 16) which appears at the selected output port 17 or 19 as the case may be. The "switching time", represented by T in this specification, indicates how long it takes for the switch to pass from one state to the other. It is a characteristic of the material.

The requirements specified in Table I are affected by certain parameters of the active ingredient. These parameters are:

(a) $n_2$ = non-linear refractive index (cm$^2$/kW);
(b) $\alpha$ = linear absorption coefficient (cm$^{-1}$);
(c) $\beta$ = two photon absorption coefficient (cm/gW).

These parameters, measured at 1.06 μm, are given for each of the four exemplified dithiolenes, in Table II.

TABLE II

| Compound | $n_2$ | $\alpha$ | $\beta$ |
|---|---|---|---|
| DTL1 | 2.1 × 10$^{-7}$ | 600 | <10 |
| DTL2 | 1.9 × 10$^{-7}$ | 400 | <10 |
| DTL3 | 5.1 × 10$^{-7}$ | 1250 | 1400 |
| DTL4 | 4.2 × 10$^{-7}$ | 4000 | <10 |

All four compounds have a switching time below 50 ps.

Two ratios, which are calculated from $n_2$, $\alpha$ and $\beta$, are inportant for satisfactory performance.

Ratio 1, which is defined by $n_2/\alpha$, relates to the "transmisson" mentioned in Table 1 above. From theoretical considerations, verified by practical experience, it is known that Ratio 1 must be greater than $10^{-10}$ for satisfactory performance.

Ratio 2, defined by $(2\beta)/n_2$, relates to whether or not switching is possible at all. Ratio 2 must be less than 10 and, for good performance, preferably less than 1.

Table III gives Ratios 1 and 2 for the four dithiolenes.

TABLE III

|  | RATIO 1 | RATIO 2 |
|---|---|---|
| DTL1 | 3.5 × 10$^{-10}$ | 10$^{-2}$ |
| DTL2 | 5 × 10$^{-10}$ | 10$^{-2}$ |
| DTL3 | 4 × 10$^{-10}$ | 5 |
| DTL4 | 1 × 10$^{-10}$ | 5 × 10$^{-3}$ |

When the active ingredient is mixed with a host to give an active composition, the parameters quoted in Table II are "diluted" accordingly. Thus for X°/o of active ingredient the parameters of the active composition are X°/o of the parameters of the pure compounds.

It will be noted that Ratios 1 and 2 are not, therefore, affected by dilution which means that dilution by a host does not fundamentally affect the basic suitability. The host is important to provide a predetermined refractive index for the active composition and to facilitate processing during the formation of the switch.

A final consideration needs to be mentioned. Ideally, all the output energy should appear at the selected output port and no energy should emerge via non-selected directions. In practice it is good enough for the non-selected energy to be below a threshold.

To achieve switching, the length of the critical zone and the intensity of actuating radiation must be correctly selected and this requires that:

$$2T = (n_2 I L)/\lambda$$

where $\lambda$ is the operational wavelength (in the medium in question), L is the length of the critical region and I is the total intensity of radiation in the critical region. As stated above, dilution decreases $n_2$ but I and/or L can be increased to compensate. In most cases it is convenient to increase L. Dilution limits are reached when L becomes too big.

Pure DTL1 gave good switching at 1.06 μm wavelength using 100 mW of optical power into a path region 3.5 μm in diameter with a path length of 1 μm in the critical region.

Figure 1:
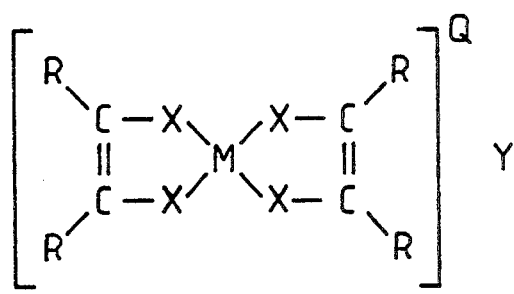
FIG. 1, as mentioned above, shows the generic formula of the dithiolenes.
Figure 4:
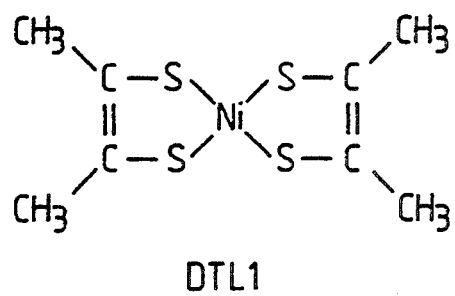
FIGS. 4-7 show structural formulae of dithiolenes suitable for use in the critical regions of switches.
Figure 5:
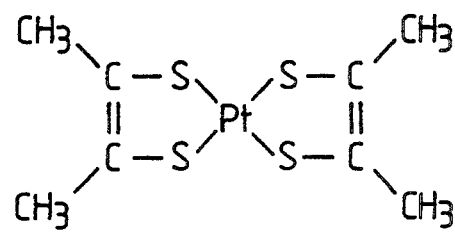
Figure 6:
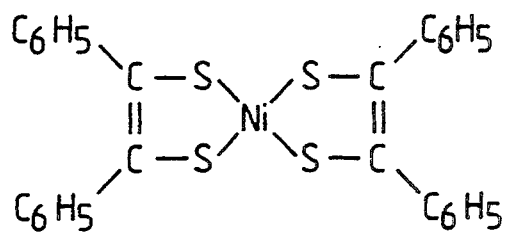

Other dithiolenes, for which satisfactory values of $n_2$, $\alpha$ and $\beta$ have been measured, are identified with reference to FIG. 1.

(I) Neutral species, ie Q c=o,

| M | R | All X |
|---|---|---|
| Ni | 4-bromophenyl | S |
| Pt | Phenyl | S |
| Pt | Methyl | S |
| Pd | Phenyl | S |
| Ni | 4-octylphenyl and methyl | S |

In the last item there is one 4-octylphenyl and one methyl group attached to each ring.

(II) Charged species, ie c= −1,

| M | Y | R | All X |
|---|---|---|---|
| Ni | TEA | phenyl | S |
| Ni | Li$^+$ or Na$^-$ | CN | S |
| Pt | TBA | CN | S |
| Ni | K$^+$ or TBA | CF$_3$ | S |
| Ni | TBA | CF$_3$ | Se |

In this listing
TEA = tetraethyl-ammonium
TBA = tetrabutyl-ammonium

The dithiolenes are known as a class of compounds and their chemistry is discussed in:

(1) J. A. McCleverty, "Metal 1,2 Dithiolene and Related Complexes", Progress in Inorganic Chemistry, Vol. 10, pp49 (1968), and (2) U. T. Mueller-Westerhoff and B. Vance, "Dithiolenes and Related Species", in "Comprehensive Co-ordination Chemistry Vol. II", Pergamon Press (Oxford), pp 595–608.

Reference (2) provides substantial information about the synthesis.

A summary of twenty active compounds is given in Table 1. In Table 1 R, M, Q, C, Y and X refer to formula 1 and gives the wave length of the absorption band.

The shortest switching time of a device is limited by the response time of the active material. The response times of all the materials listed in Table 1 was measured by autocorrelation experiments using 100 ps pulses and the results were limited by the pulse width, i.e. each response time was less than 50 ps. The observations suggest that the response times were about 1–2 ps.

TABLE 1

| CODE | R | M | O | Y | X | λ |
|------|---|---|---|---|---|---|
| 1 | methyl | Pt | 0 | — | S | 780 |
| 2 | phenyl | Pt | 0 | — | S | 780 |
| 3 | phenyl | Pd | 0 | — | S | 885 |
| 4 | methyl | Ni | 0 | — | S | 770 |
| 5 | ethyl | Ni | 0 | — | S | 770 |
| 6 | phenyl and methyl | Ni | 0 | — | S | 795 |
| 7 | phenyl & decyl | Ni | 0 | — | S | 800 |
| 8 | OPh & methyl | Ni | 0 | — | S | 805 |
| 9 | phenyl | Ni | 0 | — | S | 865 |
| 10 | H & OPh | Ni | 0 | — | S | 865 |
| 11 | 4BrPh | Ni | 0 | — | S | 870 |
| 12 | H & BPh | Ni | 0 | — | S | 870 |
| 13 | 4MPh | Ni | 0 | — | S | 900 |
| 14 | 4MOPh | Ni | 0 | — | S | 935 |
| 15 | CN & phenyl | Ni | −1 | TBA | S | 905 |
| 16 | CN | Pt | −1 | TEA | S | 865 |
| 17 | H | Ni | −1 | TEA | S | 870 |
| 18 | phenyl | Ni | −1 | TEA | S | 930 |
| 19 | CF3 | Ni | −1 | TEA | S | 800 |
| 20 | CF3 | Ni | −1 | TBA | Se | 800 |

TEA = tetraethylammonium
TBA = tetrabotylammonium
OPh = Octylphenyl
4BrPh = 4-bromophenyl
BPh = butylphenyl
4MPh = 4-methylphenyl
4MOPh = 4-methoxyphenyl Several films were prepared to illustrate the film forming properties of host/dithiolene mixtures according to the invention.

Figure 9:
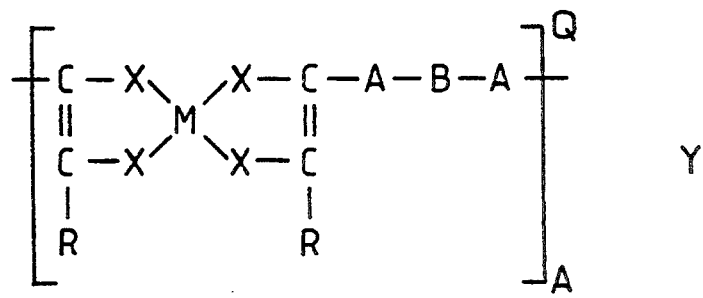
FIG. 9 shows the generic formula of polymeric dithiolenes.
Figure 10:
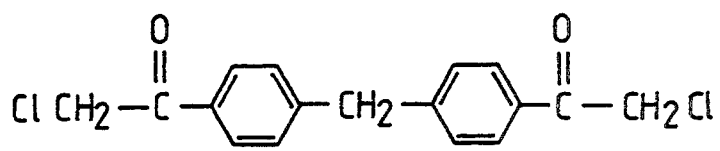
FIG. 10 shows the formula of an intermediate.

Compounds, 1, 7 and 14 as specified in Table 1 were blended with polymethylmethocrylate, polystyrene, polyvinylacetate in concentrations covering the range $1 \times 10^{18}$ to $2 \times 10^{19}$ molecules of the active material per cubic centimeter of the composition. These blends were spun and cast into films 1 to 120 μm thick. These films displayed optical activity comensurate with the concentration of the active ingredient. A polymer as shown in FIG. 9 was prepared. In this polymer
(a) all X's were S,
(b) all M's were Ni,
(c) all R's were H,
(d) all A's were —C5H4— (para),
(e) all B's were —CH2—,
(f) n was of the order 50,
(g) all Q's were zero (and Y was absent);

It has a response time below 50 ps. Its preparation will be described briefly with reference to FIG. 10 Diphenylmethane was reacted with Cl—CO—CH2Cl using AlCl3 as catalyst in a Friedel Crafts reaction to give the product shown in FIG. 10. This was converted into the final product using a conventional two-stage reaction scheme for the preparation of dithiolenes.

Stage 1 used $C_2H_5OCS_2K$ together with a mixture of HBr and acetic acid to replace the Cl—CH2—CO— groups by sulphur-containing heterocyclic rings.

Stage 2 used Na dissolved in methanol and NiCl2 with iodine as catalyst to convert two of the heterocyclic rings into a dithiolene ring system. Since the compound shown in FIG. 10 contains two heterocyclic groups, polymerisation occurs.

We claim:

1. An optical switch for switching signal radiation at a first wavelength, said switch being controlled by actuating radiation at a second wavelength which differs from said first wavelength, wherein said switch comprises one or more path regions and at least one critical region operatively associated with at least one of said path regions, wherein said switch also comprises means for providing said actuating radiation into said critical region whereby the refractive index of said critical region is changed to provide the controlled transfer of optical energy out of the path region, wherein each of said critical regions is formed of an active composition comprised of an active ingredient and a host, wherein the active ingredient contains one or more dithiolene groupings having the following formula:

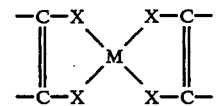

wherein the M atoms, any two of which may be the same or different, are selected from Ni, Pt, Pd and Cu, and wherein the X groups, any two of which may be the same or different, are selected from S and Se.

2. A switch according to claim 1 in which all of the X-groups of the active ingredient represent S.

3. A switch according to claim 1, wherein the host is selected from polyacrylates, polymethacrylates, polycarbonates, polyisobutylene, polyethylene terephthalate, polystyrene and polysiloxane.

4. A switch according to claim 1, wherein the response time of the active ingredient is less than 50 ps.

5. An optical switch for switching signal radiation at a first wavelength, said switch being controlled by actuating radiation at a second wavelength which differs from said first wavelength, wherein said switch comprises one or more path regions and at least one critical region operatively associated with at least one of said path regions, wherein said switch also comprises means for providing said actuating radiation into said critical region whereby the refractive index of said critical region is changed to provide the controlled transfer of optical energy out of the path region, wherein each of said critical regions is formed of an active composition comprised of an active ingredient and a host, wherein the active ingredient is one or more dithiolenes having the following generic formula:

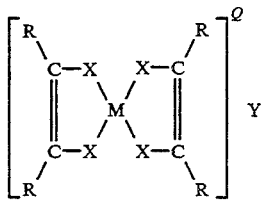

and wherein
- (A) the R groups, any two of which may be the same or different, are selected so as to tune absorption bands of the molecule for use at an operational wavelength and/or to act as bridges to link molecules together;
- (B) the X groups, any two of which may be the same or different, are selected from S and Se;
- (C) the M atoms, any two of which may be the same or different, are selected from Ni, Pt, Pd and Cu;
- (D) Q = −1 or 0; and
- (E) when Q = −1, Y is a cation to confer electrical neutrality on the molecule.

6. An optical switch according to claim 5, wherein the host is an organic transparent polymer and the R-groups are selected from:
(i) hydrogen atoms;
(ii) alkyl groups or halogenated alkyl groups with 1 to 10 carbon atoms, said groups being connected directly to the ring;
(iii) alkyl groups or halogenated alkyl groups with 1 to 10 carbon atoms connected to the ring via a bridge selected from —O—, —C₅H₄— and —NH—;
(iv) cyanide radicals;
(v) amine groups, optionally substituted with two alkyl groups having not more than 15 carbon atoms in total;
(vi) Phenyl groups, optionally substituted with Br, OCH₃, N(CH₃)₂, CH₃, Cl, F;
(vii) heterocyclic groups;
(viii) halogen atoms;
(ix) bridge groups preferably selected from alkylene or halogenated alkylene groups with 1–10 carbon atoms or said groups with one or two terminal groups selected from —O—, —C₅H₄—, and —NH—.

7. A switch according to claim 5, wherein the active ingredient has a formula chosen from one of the following:

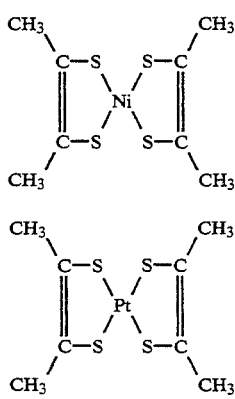

-continued

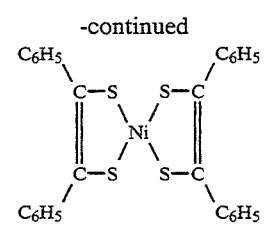

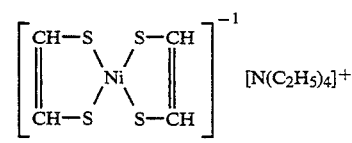

8. A switch according to claim 5, wherein the host is selected from polyacrylates, polymethacrylates, polycarbonates, polyisobutylene, polyethylene terephthalate, polystyrene and polysiloxane.

9. A switch according to claim 7, wherein the active ingredient has a formula chosen from one of the following:

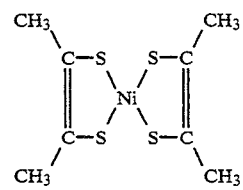

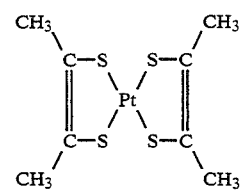

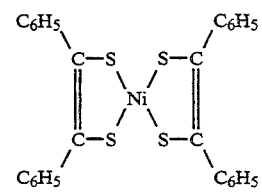

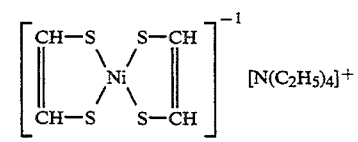

10. An optical switch comprising a waveguiding structure having one or more path regions for optical signals and one or more confining regions for retaining said optical signals in said one or more path regions, wherein said switch also comprises at least one critical region located in a confining region and adapted for switching said optical signals out of a path region by changing the refractive index of said critical regions, wherein said critical region includes an active ingredient which contains one or more dithiolene groupings hvaing the following formula:

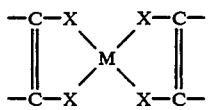

wherein the M atoms, any two of which may be the same or different, are selected from Ni, Pt, Pd and Cu, and wherein the X groups, any two of which may be the same or different, are selected from S and Se.

11. An optical switch comprising a waveguiding structure having one or more path regions for optical signals and one or more confining regions for retaining said optical signals in said one or more path regions, wherein said switch also comprises at least one critical region located in a confining region and adapted for switching said optical signals out of a path region by changing the refractive index of said critical regions, wherein said critical region includes an active ingredient, the active ingredient being one or more dithiolenes having the following generic formula:

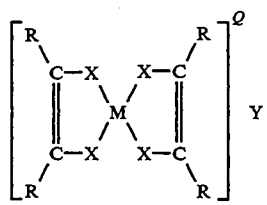

and wherein
(A) the R groups, any two of which may be the same or different, are selected so as to tune absorption bands of the molecule for use at an operational wavelength and/or to act as bridges to link molecules together;
(B) the X groups, any two of which may be the same or different, are selected from S and Se;
(C) the M atoms, any two of which may be the same or different, are selected from Ni, Pt, Pd and Cu;
(D) $Q = -1$ or 0; and
(E) when $Q = -1$, Y is a cation to confer electrical neutrality on the molecule.

12. An optical switch comprising:
a first path region having a first input port and a first output port;
a second path region having a second input port and a second output port;
a critical region located between said first and second path regions and operatively linked with each of said first and second path regions;
wherein said second input port is adapted for connection to a control laser whereby the refractive index of said critical region is changeable to switch signal radiation received at said first input port between said first output port and said second output port, and
wherein said critical region includes an active ingredient, the active ingredient containing one or more dithiolene groupings having the following formula:

wherein the M atoms, any two of which may be the same or different, are selected from Ni, Pt, Pd and Cu, and wherein the X groups, any two of which may be the same or different, are selected from S and Se.

13. An optical switch comprising:
a first path region having a first input port and a first output port;
a second path region having a second input port and a second output port;
a critical region located between said first and second path regions and operatively linked with each of said first and second path regions;
wherein said second input port is adapted for connection to a control laser whereby the refractive index of said critical region is changeable to switch signal radiation received at said first input port between said first output port and said second output port, and
wherein said critical region includes an active ingredient, the active ingredient being one or more dithiolenes having the following generic formula:

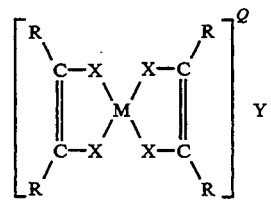

and wherein
(A) the R groups, any two of which may be the same or different, are selected so as to tune absorption bands of the molecule for use at an operational wavelength and/or to act as bridges to link molecules together;
(B) the S groups, any two of which may be the same or different, are selected from S and Se;
(C) the M atoms, any two of which may be the same or different, are selected from Ni, Pt, Pd and Cu;
(D) $Q = -1$ or 0; and
(E) when $Q = -1$, Y is a cation to confer electrical neutrality on the molecule.

14. An optical switch comprising:
a first path region having a first input port and a first output port;
a second path region having a second input port and a second output port;
a critical region located between said first and second path regions and operatively linked with each of said first and second path regions;
means for providing actuating radiation into said critical region whereby the refractive index of said critical region is changeable to switch signal radiation received at said first input port between said first output port and said second output port, and
wherein said critical region includes an active ingredient, the active ingredient containing one or more dithiolene groupings having the following formula:
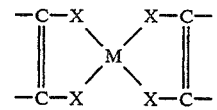
wherein the M atoms, any two of which may be the same or different, are selected from Ni, Pt, Pd and Cu, and
wherein the X groups, any two of which may be the same or different, are selected from S and Se.
* * * * *